US008052783B2

(12) United States Patent
Baker

(10) Patent No.: US 8,052,783 B2
(45) Date of Patent: Nov. 8, 2011

(54) ROTARY ADSORBERS FOR CONTINUOUS BULK SEPARATIONS

(75) Inventor: Frederick S. Baker, Oak Ridge, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 597 days.

(21) Appl. No.: 11/510,450

(22) Filed: Aug. 25, 2006

(65) Prior Publication Data

US 2008/0047436 A1    Feb. 28, 2008

(51) Int. Cl.
*B01D 53/02* (2006.01)

(52) U.S. Cl. ............... 96/125; 96/126; 96/146; 95/113; 95/148

(58) Field of Classification Search .................... 96/108, 96/121–130, 143–416; 95/115, 143, 148, 95/135, 139
See application file for complete search history.

(56) References Cited

U.S. PATENT DOCUMENTS

| | | | |
|---|---|---|---|
| 5,628,819 A * | 5/1997 | Mestemaker et al. | 96/122 |
| 5,693,123 A * | 12/1997 | Klobucar | 96/125 |
| 5,827,355 A * | 10/1998 | Wilson et al. | 95/114 |
| 5,912,423 A * | 6/1999 | Doughty et al. | 95/107 |
| 5,914,294 A | 6/1999 | Park et al. | |
| 5,925,168 A | 7/1999 | Judkins et al. | |
| 5,972,077 A * | 10/1999 | Judkins et al. | 95/136 |
| 5,972,253 A | 10/1999 | Kimber | |
| 6,030,698 A | 2/2000 | Burchell et al. | |
| 6,097,011 A | 8/2000 | Gadkaree et al. | |
| 6,176,897 B1 * | 1/2001 | Keefer | 95/98 |
| 6,258,300 B1 | 7/2001 | Burchell et al. | |
| 6,375,716 B1 | 4/2002 | Burchell et al. | |
| 6,702,875 B2 * | 3/2004 | Jagtoyen et al. | 95/90 |
| 6,783,738 B1 | 8/2004 | Sasaki et al. | |
| 2002/0170436 A1 * | 11/2002 | Keefer et al. | 96/121 |
| 2006/0286361 A1 * | 12/2006 | Yonetake | 428/293.1 |

* cited by examiner

*Primary Examiner* — Duane Smith
*Assistant Examiner* — Karla Hawkins
(74) *Attorney, Agent, or Firm* — Quarles & Brady LLP

(57) ABSTRACT

A rotary adsorber for continuous bulk separations is disclosed. The rotary adsorber includes an adsorption zone in fluid communication with an influent adsorption fluid stream, and a desorption zone in fluid communication with a desorption fluid stream. The fluid streams may be gas streams or liquid streams. The rotary adsorber includes one or more adsorption blocks including adsorbent structure(s). The adsorbent structure adsorbs the target species that is to be separated from the influent fluid stream. The apparatus includes a rotary wheel for moving each adsorption block through the adsorption zone and the desorption zone. A desorption circuit passes an electrical current through the adsorbent structure in the desorption zone to desorb the species from the adsorbent structure. The adsorbent structure may include porous activated carbon fibers aligned with their longitudinal axis essentially parallel to the flow direction of the desorption fluid stream. The adsorbent structure may be an inherently electrically-conductive honeycomb structure.

45 Claims, 1 Drawing Sheet

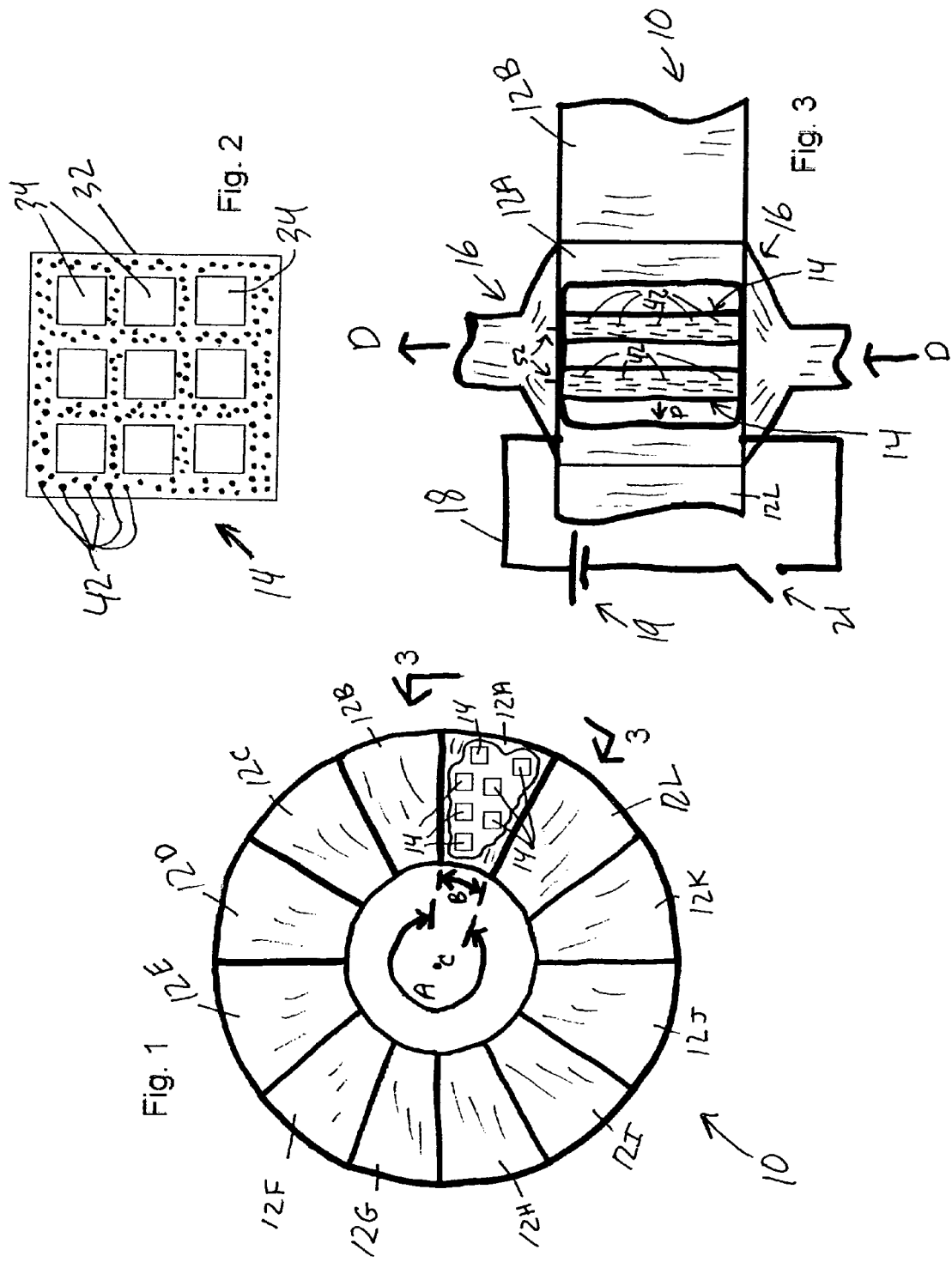

ROTARY ADSORBERS FOR CONTINUOUS BULK SEPARATIONS

STATEMENT REGARDING FEDERALLY SPONSORED RESEARCH

This invention was made with United States Government support under Contract No. DE-AC05-00OR22725 between the United States Department of Energy and U.T. Battelle, LLC. The United States Government has certain rights in this invention.

CROSS-REFERENCES TO RELATED APPLICATIONS

Not Applicable.

BACKGROUND OF THE INVENTIO

1. Field of the Invention

This invention relates to an adsorption system for continuous bulk separations where separation of a species in a fluid stream is accomplished through continuous selective adsorption onto an adsorbent and subsequent desorption of the species from the adsorbent.

2. Description of the Related Art

The potential of adsorption systems for bulk separations has not been realized on industrially significant scales. Despite inherently low thermal efficiencies, distillation is still the operation of choice for bulk separation of a broad range of compounds. Adsorption separations can be carried out with greater thermal efficiencies, but they typically involve higher capital cost, batch wise operation, and are relatively unfamiliar technologies in the bulk separations industry.

Rotary solvent concentrator wheels are a well-established technology for the removal of solvent vapors in automotive spray booth air; i.e., for concentration of the volatile organic compounds (VOCs) to permit economical incineration. The rotary wheel includes an adsorbent material through which a high volume of VOC-laden air is passed at near ambient temperature. The wheel rotates, exposing about 330° of the arc to the contaminated air stream, resulting in capture of the VOCs on the adsorbent and discharge of clean air to the environment. As the wheel continues to rotate, the adsorbent passes through a regeneration zone, covering about 30° of the arc, through which a much lower volume of hot air (e.g., at a temperature of about 120° C.) is passed. The captured VOCs are desorbed into the hot air stream, which is passed to an incinerator for destruction of the VOCs. In essence, about a 20:1 concentration of the VOCs is obtained, which makes possible the economical incineration of the VOCs. U.S. Pat. No. 5,693,123 describes the use of such a rotary concentrator with extruded adsorbent blocks for removal of impurities from gas streams.

However, there is still a need for an improved adsorber system where separation of a species in the fluid stream is accomplished through continuous selective adsorption onto an adsorbent and subsequent desorption of the species from the adsorbent.

SUMMARY OF THE INVENTION

The present invention provides an adsorption system for continuous bulk separations. In one form, the invention is a rotary adsorber including an electrically-conductive adsorbent (e.g., activated carbon fibers) in the physical form of a monolith having internal passageways (e.g., a honeycomb) configured as a rotating wheel. A fluid stream containing volatile chemicals to be separated is passed through the adsorption zone of the rotating wheel, where separation of species in the fluid stream is accomplished through selective adsorption onto the adsorbent, and in a continuous manner. If further separation is required, the effluent fluid stream is passed through a second rotary adsorber wheel, in which the adsorbent properties are specifically tailored to those species still present in the fluid stream. Removal of adsorbed species in the wheel(s) is accomplished as the continuously rotating wheel passes through a desorption (regeneration) zone, where an electrical current is passed through the electrically-conductive adsorbent of the wheel in the direction of fluid flow. Through a resistive heating effect, the adsorbed species are removed from the electrically-conductive adsorbent and pass into another, clean fluid stream, thereby achieving separation of the species in the original influent fluid stream.

Therefore, regeneration of the adsorbent media in the present invention can be accomplished simultaneously with adsorption in the same adsorber system without perturbation of steady state conditions. In an example rotary absorber of the invention, the VOC-laden gas stream passes through the rotary adsorption unit where VOCs are selectively adsorbed on the adsorbent media in the wheel. The effluent gas stream may pass onto a second adsorber for separation of another target species, or, if no further processing is required, is routed to a collection point (or discharged to the atmosphere if appropriate). Adsorbed VOC(s) are continuously desorbed from the adsorption media as the revolving wheel passes through the regeneration zone of the system. Desorption is accomplished through application of an electric current through only that region of the wheel passing through the regeneration zone (e.g., 30 degrees of arc). A low volume of gas may be used to assist desorption and removal of the VOC(s) from the adsorber wheel, which again could be passed to another wheel for additional separation of VOC species if desired. If necessary, additional energy can be furnished to the regeneration zone by heating the purge gas. Separations of fixed gases could be similarly achieved using the rotary adsorber wheel system.

In an example rotary absorber of the invention, a honeycomb form of an adsorbent material (e.g., activated carbon or zeolite, etc.) can be used for the separation of either VOCs or gases. By virtue of their design, honeycomb forms exhibit much lower pressure drop characteristics (higher gas permeability) than the monolithic form, and as such are suitable for, and are currently used in, industrial applications involving high gas flow rates (face velocity and volumetric). Honeycomb forms can be engineered for diverse applications in which pressure drop is of paramount concern. In comparison, monolithic materials exhibit relatively high pressure drop which restricts their use to applications in which high gas flow rates are not a factor.

Honeycomb forms can be produced through the extrusion of an activated carbon material, powdered or fibrous, using a suitable binder. A wide and diverse range of activated carbon products can be incorporated into the honeycomb form, including those derived from different precursor materials, different activation processes (thermal or chemical), and which exhibit very different pore size distributions. Many VOCs of even moderate molecular weight necessitate the use of mesoporous activated carbon for adsorption, and many prior processes (as currently practiced) are not amenable to the production of wider pore carbons or the very high surface area products which can be produced through chemical activation techniques (e.g., 3,000 $m^2/g$ determined by the BET method according to a nitrogen adsorption method). Further-more, it is very difficult, even on a lab scale, to obtain uniform thermal activation through monoliths; i.e., with respect to surface area and porosity. In contrast, the process of the invention may start with an activated carbon product (routinely produced on a commercial scale with a relatively high degree of uniformity).

During extrusion of the honeycomb form, the activated carbon fibers preferentially align with their longitudinal axis parallel to the longitudinal axis of the extruded honeycomb form, i.e., in the direct of extrusion. This results in enhanced electrical conductivity through the honeycomb in the longitudinal direction, which is the direction of gas flow through the adsorber wheel, thereby facilitating desorption of the captured species through application of an electric current. Conversely, electrical conductivity of the adsorbent in a direction perpendicular to the direction of gas flow (i.e., perpendicular to the alignment of the carbon fibers and direction of extrusion) would be much lower, thereby minimizing undesired current leakage in that direction.

Therefore, in one aspect, the invention provides an apparatus for separating a target species from a fluid stream. The apparatus includes an adsorption zone in fluid communication with an adsorption fluid stream, and a desorption zone in fluid communication with a desorption fluid stream. The adsorption fluid stream and the desorption fluid stream may be gas streams or liquid streams. The apparatus also includes at least one adsorption block including an adsorbent structure. The adsorbent structure is suitable for adsorbing the target species that is to be separated from the fluid stream. The apparatus includes means for sequentially moving each adsorption block through the adsorption zone and through the desorption zone. The apparatus also includes a desorption circuit in electrical communication with the desorption zone such that an electrical current can be passed through the adsorbent structure that is present in the desorption zone thereby desorbing the species from the adsorbent structure. In one version of the invention, the adsorbent structure includes porous activated carbon fibers. In another version of the invention, the adsorbent structure includes conductive adsorbent fibers longitudinally aligned in the flow direction of the desorption fluid stream.

In one form, the means for sequentially moving each adsorption block through the adsorption zone and through the desorption zone is a rotary wheel. When the means for sequentially moving each adsorption block through the adsorption zone and through the desorption zone comprises a rotary wheel, the adsorption zone may be a rotational arc of the rotary wheel of at least 180 degrees, preferably at least 240 degrees, and most preferably at least 330 degrees.

In one form, the adsorbent structure is a honeycomb structure. The walls of the honeycomb structure have may varied thickness. The honeycomb structure may have cell densities in the range of 10-1000 cells per square inch. Preferably, the adsorbent structure is a permeable structure formed from carbon fibers bonded with an inorganic or a carbonizable organic binder. The carbon fibers may have more mesopore volume than micropore volume. Pores are classified by diameter as follows: micropores (less than 2 nanometers), mesopores (2-50 nanometers), and macropores (greater than 50 nanometers). The carbon fibers may have a surface area of greater than 1200 $m^2/g$ determined by the BET method according to a nitrogen adsorption method.

In another aspect, the invention provides a method for separating a species from a fluid stream, which may be a gas stream or a liquid stream. In the method, an adsorbent structure suitable for adsorbing the species is used. The adsorbent structure may include conductive adsorbent fibers such as activated carbon fibers. The fluid stream is passed in a longitudinal flow direction through the cellular structure of the adsorbent honeycomb to adsorb the species on the adsorbent material. An electrical current is then passed through the adsorbent structure to desorb the species from the adsorbent structure. A desorption fluid stream at ambient temperature (at the level of the surroundings where the method is practiced) or elevated temperature may be passed over the adsorbent structure to carry the desorbed species away from the adsorbent structure. Preferably, the conductive adsorbent fibers are aligned with their longitudinal axis essentially parallel to the flow direction of the fluid stream. The adsorbent structure may be a honeycomb structure, and the walls of the honeycomb structure may have varied thickness to aid in the adsorption of selected species such as VOCs. In general, thinner wall thickness will facilitate fast diffusion of the fluid through the walls of the honeycomb structure, whereas thicker wall thickness will enhance adsorptive capacity. The honeycomb structure may have cell densities in the range of 10-1000 cells per square inch. Preferably, the adsorbent structure is a permeable structure formed from a plurality of porous carbon fibers bonded with an inorganic or a carbonizable organic binder. The carbon fibers may have more mesopore volume than micropore volume to aid in the adsorption of selected species such as VOCs. The carbon fibers may have a surface area of greater than 1200 $m^2/g$ (determined by the BET method according to a nitrogen adsorption method) to aid in the adsorption of selected species such as VOCs.

Thus, it is an advantage of the present invention to provide a rotary adsorber wheel that can be used to replace conventional separation devices, such as distillation columns, for the bulk separation of volatile organic compounds and gases.

It is another advantage to provide a rotary adsorber wheel that uses electric swing regeneration and activated carbon fibers that are aligned in a honeycomb adsorbent structure such that the lengthwise alignment of the activated carbon fibers is essentially parallel to the direction of gas flow through the adsorbent medium, thereby maximizing flow of electric current in this direction. Concomitantly, electric current flow is minimized in the undesired, counter-productive direction of across or around the wheel, which would hinder adsorption of the target species.

It is yet another advantage to provide an adsorbent media structure configured for minimum pressure drop with a pore size distribution tailored to capture of the target volatile organic carbon (or gas) species, thereby facilitating more effective and efficient (lower energy input) bulk separations of such species.

The present invention leverages rotary solvent concentrator wheel technology for novel separations on bulk scales and with continuous, cost-savings operation. There is reduced energy consumption for bulk separations as electrical swing regeneration of the adsorbent is more energy-efficient compared to thermal swing. The overall separations process can be carried out without large temperature variations, resulting in much less degradation of thermally-labile organics. The invention also permits higher temperatures of regeneration that are not possible with paper-based honeycomb systems.

The present invention provides for faster cycling of adsorption-desorption operations under near isothermal conditions and therefore provides for more energy-efficient processing. Direct heating of the adsorbent bed (not of gas phase) allows for such operation. In the invention, the adsorbents are preferably configured in honeycomb form for minimum pressure drop and fast adsorption kinetics. Adsorption can be from both gas and liquid phases. As well as for the gas phase, electrical swing regeneration in liquid phase is possible. Liquid phase desorption/regeneration can be accomplished using a suitable solvent, including water (equivalent of using air or other gas for gas phase desorption/regeneration).

These and other features, aspects, and advantages of the present invention will become better understood upon consideration of the following detailed description, drawings and appended cla

BRIEF DESCRIPTION OF THE DRAWINGS

FIG. 1 is a top schematic view of a rotary adsorber according to the invention.

FIG. 2 is a top view of a monolithic adsorbent material used in the invention.

FIG. 3 is side view of the rotary adsorber of FIG. 1 taken along line 3-3 of FIG. 1.

Like reference numerals will be used to refer to like parts from Figure to Figure in the following description of the drawings.

DETAILED DESCRIPTION OF THE INVENTION

A rotary adsorber wheel according to the invention comprises an electrically-conductive adsorbent in the physical form of a monolith having internal passageways, notably a honeycomb or other suitable form, configured as a wheel. For most applications, the adsorbent in the honeycomb includes largely an activated carbon material, notably activated carbon fibers, bonded with a suitable organic or inorganic binder. A fluid stream, typically air, containing the target volatile organic (or inorganic) species to be separated is passed through the adsorption zone (typically 330 degrees of arc) of the rotating wheel, where certain of the species are adsorbed on the adsorbent. The porosity and surface chemistry of the adsorbent are tailored to the capture of specific chemical species. Species not adsorbed pass through the wheel, thereby achieving separation. Further separations on the species discharged from the adsorption zone could be achieved by passing the effluent gas stream through a second wheel (or even more wheels), the properties of which would be specifically tailored to the adsorption of those species. Release of the captured species in the first (and subsequent wheels) is accomplished by passing a low voltage current through the adsorbent media as it passes through the desorption (regeneration) zone of the wheel (typically 30 degrees of arc). In principle, only that amount of electrical energy equivalent to the heat of adsorption of the adsorbed species need be applied, with an appropriate flow of air (or inert gas). Thus, a temperature rise, per se, to remove the adsorbed species (regenerate the adsorbent) is not necessarily required to affect removal of the adsorbed species from the adsorbent media. Through this means, yet further separation of the volatile organic compounds in the original influent gas stream is achieved.

Similar concepts can be applied to liquid phase separations. For example, a liquid stream can be passed through a rotating adsorbent wheel, resulting in adsorption of target species and rejection (separation) of others. Desorption of the adsorbed species can be accomplished by passing a clean liquid stream (aqueous or organic) through the wheel in the regeneration zone. Depending on the nature of the eluting liquid stream, electrical swing techniques can be applied to facilitate desorption.

Referring now to FIGS. 1 and 3, there is shown one example apparatus 10 according to the invention for separating a species from a fluid stream. The apparatus 10 includes a plurality of arcuate fan-shaped hollow adsorption blocks 12A to 12L that are assembled together to form a rotary wheel that rotates about a centerpoint C. The rotary wheel includes a frame for supporting the adsorption blocks 12A to 12L. While twelve adsorption blocks are shown in FIG. 1, the invention would work with one (wheel sized), or more (smaller), adsorption blocks. Each adsorption block 12A to 12L includes at least one adsorbent structure 14. In FIG. 1, adsorbent structures 14 are illustrated in adsorption block 12A. The adsorbent structures 14 adsorb one or more species from an influent fluid stream as described below.

The apparatus 10 includes an adsorption zone that encompasses adsorption blocks 12B to 12L in FIG. 1, and a desorption zone that encompasses the adsorption block 12A in FIG. 1. In FIG. 1, the extent of the adsorption zone is shown by arc A, and the extent of the desorption zone is shown by arc B. As the rotary wheel rotates, the adsorption blocks sequentially enter the adsorption zone and during 330° of rotation as shown by arc A, an adsorption block is in the adsorption zone. During 30° of rotation as shown by arc B, an adsorption block is in the desorption zone.

An adsorption fluid stream is provided by a fluid delivery system to the adsorption zone. The fluid delivery system has appropriate seals and manifolds such that the fluid stream flows through the adsorption blocks in the adsorption zone. As the fluid stream contacts the adsorbent structures in the adsorption blocks in the adsorption zone, a target species of interest in the fluid stream is adsorbed on the adsorbent structures 14.

Looking now at FIG. 3, a desorption fluid stream D is provided by a desorption fluid delivery system 16 to the desorption zone. The desorption fluid delivery system 16 has appropriate seals and manifolds such that the desorption fluid stream D flows through the adsorption block in the desorption zone. Also, when an adsorption block enters the desorption zone, the adsorption block is placed in electrical communication with a desorption circuit 18 having an electrical power source 19 and a switch 21 (if desired). The desorption circuit 18 provides an electrical current that is passed through the adsorbent structure 14 in each adsorption block that is present in the desorption zone. One skilled in the art can arrange suitable electrical contacts between the desorption circuit 18, the adsorption block in the desorption zone, and the adsorbent structure 14.

Thus, as the rotary wheel rotates, each adsorption block sequentially moves through the adsorption zone and the desorption zone as follows. Upon entering the adsorption zone, an adsorption block will receive an influent adsorption fluid stream provided by the fluid delivery system for the adsorption zone. The fluid stream enters one end of the adsorption block and contacts the adsorbent structures 14 in the adsorption block. The fluid stream then exits an opposite end of the adsorption block. Throughout the 330° arc of the adsorption zone, the adsorbent structures 14 adsorb a target species of interest from the fluid stream. After leaving the adsorption zone, the adsorption block enters the desorption zone as shown in FIG. 3. The flow of electric current through the adsorbent structures 14 in the desorption zone heats the adsorbent structures 14 and acts to thermally desorb the species of interest from the adsorbent structures 14. The amount of current necessary to accomplish the desorption will depend on the conductivity of the adsorbent structures 14, as well as other factors which are known in the art. The power is typically low-voltage, usually less than about 150 volts AC or DC. After being desorbed from the adsorbent structures 14, the species of interest is carried away in the desorption fluid stream D.

The adsorbent structures 14 can be manufactured using known extrusion methods. One such method is shown in U.S. Pat. No. 5,914,294 (which is incorporated herein by reference along with all other documents cited herein). As disclosed in U.S. Pat. No. 5,914,294, an adsorbent structure is made by mixing together activated carbon, ceramic forming material, flux material, binder, and water to make an extrudable mixture. The extrudable mixture is extruded through an extrusion die to form the monolith having the honeycomb structure. After extrusion, the extruded honeycomb monolith retains its shape while it is dried and then fired at a temperature and for a time period sufficient to react the ceramic forming materials to form a honeycomb monolith having activated carbon dispersed throughout the honeycomb structure and having sufficient strength for its intended use. In the present invention, activated carbon fibers (or other suitable adsorbents, such as zeolites) are used in place of the activated carbon powder mentioned in U.S. Pat. No. 5,914,294. Appropriate activated carbon fibers include those derived from isotropic or mesophase pitch precursors, or from other suitable materials. In general, suitable activated carbon fibers have a diameter in the range of approximately 10-50 microns. The fibers preferably have a length in the range of approximately 100-1000 microns, and more preferably in the range of 100 to 400 microns.

Many VOCs of even moderate molecular weight necessitate the use of mesoporous activated carbon for adsorption, and this alternative process is amenable to the production of wider pore carbons or the very high surface area products which can be produced through chemical activation techniques (e.g., as high as about 3,000 $m^2/g$ as measured by nitrogen BET). The adsorbent structures produced by this method provide for carbon fibers having more mesopore volume than micropore volume which aids in the adsorption of VOCs. Preferably, the adsorbent structures produced by this method provide for carbon fibers having a surface area of greater than 1,000 $m^2/g$, preferably greater than about 2,000 $m^2/g$, and most preferably greater than about 3,000 $m^2/g$, the surface area being measured by a nitrogen BET method.

Looking at FIG. 2, the adsorbent structure 14 can be manufactured in honeycomb form for low pressure drop, fast adsorption kinetics, and high mechanical strength. The electrical, physical (cell geometry, etc.), and mechanical properties of the honeycombs can be respectively tailored for electrical swing adsorption and fluid flow through the rotary wheel. Through well-established carbon processing techniques, the electrical conductivity of the carbon fiber adsorbent can be enhanced for the purpose of obtaining sufficient electrical conductivity, either before incorporation into the honeycomb monolithic form and/or after incorporation into the honeycomb monolith. Advantageously, cell densities can be varied from just a few per square inch to many hundreds per square inch (e.g., 2-1000 cells per square inch) and adsorbent wall thickness can also be varied, thereby permitting the tailoring of the best combination of adsorption capacity, adsorption kinetics, selectivity, and pressure drop for a given industrial application. Production of honeycomb forms of adsorbents using extrusion processing techniques is understood by those skilled in the art of monolith production. In FIG. 2, the adsorbent structure 14 is a honeycomb shape having a square outer perimeter 32 and square open channels 34. However, any shape for the walls is possible including, without limitation, triangular, rectangular, circular, oval, elliptical, hexagonal, octagonal, etc.

In one aspect of the invention, the adsorbent structure 14 is prepared using extrusion processing conditions in which the activated carbon fibers are predominantly aligned in a preferred single direction. Looking at FIGS. 2 and 3, the activated carbon fibers 42 are preferentially aligned with their longitudinal axis parallel to the longitudinal axis 52 of the extruded honeycomb form; i.e., in the direct of extrusion of the honeycomb adsorbent structure 14. This results in enhanced electrical conductivity through the honeycomb adsorbent structure 14 in the longitudinal direction, which is the direction of subsequent fluid flow (see arrow D in FIG. 3) through the rotary adsorber wheel, thereby facilitating desorption of the captured species through application of an electric current as described above. Conversely, electrical conductivity of the adsorbent in a direction perpendicular to the direction of fluid flow, i.e., across the adsorbent perpendicular to the alignment of the carbon fibers (see arrow P in FIG. 3), will be much lower, thereby minimizing undesired current leakage into the adsorption zone of the absorber wheel, which is counterproductive. Alignment of the activated carbon fibers can also be enhanced by carrying out the extrusion of the adsorbent structure 14 under the influence of an electrical field. In the invention, the activated carbon fiber possesses the required properties of both adsorbent and electrical conductor, and therefore its adsorptive capacity is not diluted by the addition of another material. Accordingly, the activated carbon fibers may be the sole adsorbent/conductor in the adsorbent structure 14.

Therefore, it can be seen that the invention provides an adsorption system for continuous bulk separation of volatile organic compounds, separation of gases, purification of gases, separation of organic compounds in solution, purification of organic compounds in solution, separation of inorganic compounds in solution, and purification of inorganic compounds in solution.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. An apparatus for separating a target species from a fluid stream, the apparatus comprising:
    an adsorption zone in contact with an adsorption fluid stream;
    a desorption zone in contact with a desorption fluid stream;
    at least one adsorption block including an adsorbent structure suitable for adsorbing the target species from the adsorption fluid stream;
    means for sequentially moving each adsorption block through the adsorption zone and the desorption zone; and
    a desorption circuit in electrical communication with the desorption zone such that an electrical current can be passed through adsorbent structure that is present in the desorption zone thereby desorbing the target species from adsorbent structure that is present in the desorption zone,
    wherein the adsorbent structure is produced by extrusion of electrically-conductive porous activated carbon fibers.

2. The apparatus of claim 1 wherein:
    the means for sequentially moving each adsorption block through the adsorption zone and the desorption zone comprises a rotary wheel.

3. The apparatus of claim 2 wherein:
    the adsorption zone includes a rotational arc of the rotary wheel of at least 180 degrees.

4. The apparatus of claim 1 wherein:
    the carbon fibers are aligned with their longitudinal axis essentially parallel to a flow direction of the desorption fluid stream.

5. The apparatus of claim 1 wherein:
    the carbon fibers are aligned with their longitudinal axis essentially parallel to a flow direction of the adsorption fluid stream.

6. The apparatus of claim 1 wherein:
    the adsorbent structure is a honeycomb structure.

7. The apparatus of claim 6 wherein:
walls of the honeycomb structure have varied thickness.

8. The apparatus of claim 6 wherein:
the honeycomb structure has cell densities in the range of 10-1000 cells per square inch.

9. The apparatus of claim 1 wherein:
the adsorption fluid stream and the desorption fluid stream are gas streams.

10. The apparatus of claim 1 wherein:
the adsorption fluid stream and the desorption fluid stream are liquid streams.

11. The apparatus of claim 1 wherein:
the carbon fibers are extruded with a carbonizable organic binder.

12. The apparatus of claim 1 wherein:
the carbon fibers are extruded with an inorganic binder.

13. The apparatus of claim 1 wherein:
the carbon fibers have more mesopores than micropores.

14. The apparatus of claim 1 wherein:
the carbon fibers are predominantly microporous.

15. The apparatus of claim 1 wherein:
the carbon fibers having a surface area of greater than 1,000 $m^2/g$ as measured by a BET method.

16. The apparatus of claim 1 wherein:
the target species is in the form of a vapor.

17. The apparatus of claim 16 wherein:
the vapor is a volatile organic compound.

18. The apparatus of claim 1 wherein:
the target species is a gas.

19. The apparatus of claim 18 wherein:
the gas is nitrogen or oxygen.

20. The apparatus of claim 1 wherein:
the target species is a solute and the fluid stream is liquid.

21. The apparatus of claim 1 wherein:
the electrically-conductive porous activated carbon fibers are the sole adsorbent and the sole conductor in the adsorbent structure.

22. An apparatus for separating a target species from a fluid stream, the apparatus comprising:
an adsorption zone in contact with an adsorption fluid stream;
a desorption zone in contact with a desorption fluid stream;
at least one adsorption block including an adsorbent structure suitable for adsorbing the target species from the adsorption fluid stream;
means for sequentially moving each adsorption block through the adsorption zone and the desorption zone; and
a desorption circuit in electrical communication with the desorption zone such that an electrical current can be passed through adsorbent structure that is present in the desorption zone thereby desorbing the target species from adsorbent structure that is present in the desorption zone,
wherein the adsorbent structure is produced by extrusion of porous activated conductive adsorbent fibers such that the fibers are aligned with their longitudinal axis essentially parallel to a flow direction of the desorption fluid stream.

23. The apparatus of claim 22 wherein:
the means for sequentially moving each adsorption block through the adsorption zone and the desorption zone comprises a rotary wheel.

24. The apparatus of claim 23 wherein:
the adsorption zone includes a rotational arc of the rotary wheel of at least 180 degrees.

25. The apparatus of claim 22 wherein:
the conductive adsorbent fibers comprise activated carbon fibers.

26. The apparatus of claim 25 wherein:
the carbon fibers have more mesopore volume than micropore volume.

27. The apparatus of claim 25 wherein:
the carbon fibers having a surface area of greater than 1,000 $m^2/g$ as measured by a BET method.

28. The apparatus of claim 22 wherein:
the adsorbent structure is a honeycomb structure.

29. The apparatus of claim 28 wherein:
walls of the honeycomb structure have varied thickness.

30. The apparatus of claim 28 wherein:
the honeycomb structure has cell densities in the range of 10-1000 cells per square inch.

31. The apparatus of claim 22 wherein:
the adsorption fluid stream and the desorption fluid stream are gas streams.

32. The apparatus of claim 22 wherein:
the adsorption fluid stream and the desorption fluid stream are liquid streams.

33. The apparatus of claim 22 wherein:
the desorption fluid stream is at ambient temperature.

34. The apparatus of claim 22 wherein:
the desorption fluid stream is above ambient temperature.

35. The apparatus of claim 22 wherein:
the adsorbent structure is produced by extruding a plurality of porous carbon fibers with a carbonizable organic binder.

36. The apparatus of claim 22 wherein:
the adsorbent structure is produced by extruding a plurality of porous carbon fibers with an inorganic binder.

37. The apparatus of claim 22 wherein:
the conductive adsorbent fibers are the sole adsorbent and the sole conductor in the adsorbent structure.

38. The apparatus of claim 1 wherein:
the electrically-conductive porous activated carbon fibers have uniform surface area.

39. The apparatus of claim 38 wherein:
the electrically-conductive porous activated carbon fibers are dispersed throughout the adsorbent structure.

40. The apparatus of claim 1 wherein:
the electrically-conductive porous activated carbon fibers have uniform porosity.

41. The apparatus of claim 40 wherein:
the electrically-conductive porous activated carbon fibers are dispersed throughout the adsorbent structure.

42. The apparatus of claim 22 wherein:
the activated conductive adsorbent fibers have uniform surface area.

43. The apparatus of claim 42 wherein:
the activated conductive adsorbent fibers are dispersed throughout the adsorbent structure.

44. The apparatus of claim 22 wherein:
the activated conductive adsorbent fibers have uniform porosity.

45. The apparatus of claim 44 wherein:
the activated conductive adsorbent fibers are dispersed throughout the adsorbent structure.

* * * * *